Patented Apr. 27, 1937

2,078,638

UNITED STATES PATENT OFFICE

2,078,638

PURIFICATION OF SULPHONATION PRODUCTS

Bruno v. Reibnitz, Mannheim, Germany, assignor to I. G. Farbenindustrie Aktiengesellschaft, Frankfort-on-the-Main, Germany No Drawing. Application December 22, 1934, Serial No. 758,870. In Germany December 23, 1933

12 Claims. (Cl. 260—99.12)

The present invention relates to a process for the purification of sulphonation products of non-aromatic alcohols, especially for the removal of inorganic salts therefrom.

In the production of sulphonation products of organic compounds mixtures are obtained which by reason of the presence of excess amounts of sulphonating agents or other mineral acids contain after neutralization in the usual manner considerable amounts of inorganic salts, as for example Glauber's salt, common salt and the like besides the organic sulphonation products. Frequently it is desirable, however, to obtain sulphonation products which practically contain no inorganic salts. The removal of the inorganic salts from sulphonation products of organic compounds was hitherto attended by considerable difficulties.

I have now found that very valuable sulphonation products of non-aromatic alcohols which are practically free from inorganic salts, can be obtained by treating aqueous solutions of the salt containing sulphonation products which may still contain unsulphonated constituents at temperatures not exceeding 50° C. with water-soluble organic solvents and with water-insoluble organic solvents (which may be applied separately or in the form of mixtures), preferably in the absence of free alkali, separating from one another the layers thereby formed and recovering from the non-aqueous layer the pure sulphonation product. For the purpose of the present invention the expression non-aromatic alcohols is intended to mean open chain aliphatic alcohols as well as cycloaliphatic and aliphatic-aromatic alcohols, in which the hydroxyl is attached to the aliphatic radicle. Initial materials suitable for the present process are for instance salt containing sulphonation products of octyl alcohol, decyl alcohol, undecyl alcohol, dodecyl alcohol, myristyl alcohol, cetyl alcohol, octodecyl alcohol, oleyl alcohol, as well as of octodecandiol, montanol and the like. Furthermore sulphonation products of methyl cyclohexanol, cholesterol, benzyl alcohol, cinnamic alcohol may be used as starting materials. Suitable initial materials are also sulphonation products of alcohol mixtures, which are obtainable, for example, by catalytically hydrogenating fatty acids or glycerides thereof or materials containing the same, as for example vegetable or animal oils or fats, such as soy bean oil, palm kernel oil, castor oil, coconut oil, train oils, tallow and the like, or alcohol mixtures obtained by the oxidation of paraffinic hydrocarbons, such as hard paraffin, soft paraffin, paraffin oil, middle oil, certain fractions of mineral oils and the like, or of products obtained by the hydrogenation of oxidation products of paraffinic hydrocarbons. Sulphonation products of alcohols obtained by saponifying natural or synthetic waxes containing high molecular alcohols, for example spermaceti, may also be employed as initial materials.

Water-soluble solvents especially suitable for the present process are low-molecular liquid compounds of the aliphatic series, as for example low molecular alcohols, ketones, carboxylic acids or their mixtures, preferably methyl alcohol, ethyl alcohol, acetone or methyl-ethyl-ketone. Suitable water-insoluble solvents are for instance low boiling aliphatic, cycloaliphatic or aromatic hydrocarbons, as for example low boiling mineral oil fractions, as well as halogenated hydrocarbons, such as carbon tetrachloride, chloroform, ethylene trichloride, furthermore ethers or esters, such as diethyl-ether, methyl-ethylether, acetic acid ethyl ester or acetic acid amyl ester. Mixtures of the said solvents are also suitable. Solvents which favor the rapid formation of layers, as for example benzine, may advantageously be used.

The solvents may be added in any sequence. After thoroughly mixing the sulphonation product with the aforesaid solvents, if desired while cooling, formation of layers occurs, the lower aqueous layer containing almost the total amount of inorganic salts contained in the initial sulphonation product and only a very slight amount of the sulphonation product, whereas the upper layer contains the organic sulphonation product which is practically free from inorganic salts. The sulphonation products of some alcohols separate out totally or partly in the solid form, whereby the formation of layers is frequently impaired. In this case the formation of layers may be assisted by allowing the material to stand for a prolonged time. It is frequently recommendable to separate the precipitated sulphonation products by simply filtering them off from the liquid constituents or by centrifuging.

The nature of the water-soluble and water-insoluble solvents to be applied, as well as the amount in which same are to be employed are selected in each particular case according to the kind of the sulphonation product and the concentration of the solution. For example for the treatment of an aqueous solution of 100 parts by weight of a dodecyl alcohol sulphonate containing 25 per cent of inorganic salts, from 80 to 150 parts by weight of benzine and from 30 to 60 parts by weight of methyl- or ethyl-alcohol may be used with advantage. The treatment of the salt containing sulfonation product with the said solvents may be repeated, if necessary, several times, until the sulphonation product is practically free from inorganic salts. In some cases it is advantageous in the second treatment of the sulphonation products with the said solvents to add small amounts of salts, which are very easily removable according to the present process, such as common salt. In the present process special care must also be taken with respect to the hydrogen ion concentration of the aqueous solution; the pH-value should usually range between 6 and 7. Preferably before the treatment acid should be added, if any alkali is present, in order to neutralize the same. The most favorable conditions suitable for each particular case can easily be ascertained by a preliminary experiment.

The process is carried out at comparatively low temperatures, for example between from 5° below zero C. to about 25° C. preferably at about zero C. If the initial material still contains unsulphonated constituents, these may be removed before or after separating off the inorganic salts, for example according to the process described in the co-pending U. S. application Ser. No. 678,470.

The present invention allows to obtain sulphonation products of cycloaliphatic, aliphatic, aromatic or aliphatic alcohols of high molecular weight in a salt-free state and moreover in a state of high concentration. After distilling off the organic solvents from the layer containing the sulphonation product usually a pasty mass is obtained which may be directly employed for many purposes, as for example for the preparation of mixtures with soap. By drying the pasty mass, the sulphonation may be readily obtained in a solid form.

The process according to the present invention is advantageous when employing as starting materials sulphonation products of alcohols which are obtained in the catalytic hydrogenation of oxidation products of hydrocarbons of the paraffin series and which often contain unsulphonated matter.

The process according to the invention may also be employed for working up mixtures, already present in a dry state, of sulphonation products of the said alcohols containing inorganic salts. Such products are dissolved in water and treated in the manner described.

The following examples illustrate the invention, but they are not intended to restrict the invention thereto; the parts are by weight.

Example 1

100 parts of a product, obtained by the hydrogenation of the unsaponifiable constituents of an oxidation product from crude scale wax which has the hydroxyl number 178 and a content of unsaponifiable constituents of about 30 per cent, are dissolved in 200 parts of benzine and sulphonated at a low temperature with 37 parts of chlorosulphonic acid. The reaction product is then neutralized by the addition of about 230 parts of a 10 per cent caustic soda solution until the pH value is between about 6 and 7. 150 parts of ethyl alcohol are then added to the mixture and the latter is extracted at normal temperature while thoroughly mixing five times with benzine, boiling below 100° C., 100 parts thereof being employed in each treatment; hereby practically all the unsaponified constituents are removed. The remaining aqueous solution of the sulphonate still contains besides the inorganic salts of ethyl alcohol and colloidally dissolved benzine in amounts sufficient for the formation of layers. After cooling down to 0° C., while adding 100 parts of ice, two layers are formed. The lower layer (about 350 parts) which is a salt solution containing nearly the total amount of inorganic salts and only 2 per cent of the sulphonation product, is withdrawn. The upper layer is evaporated and the product formed is dried. Thus 100 parts of a sulphonation product are obtained which contains about 1 per cent of water and from about 1 to 2 per cent of common salts and sodium sulphate.

Example 2

100 parts of a product prepared by sulphonating alcohols obtainable by catalytically hydrogenating fatty acids of coconut oil and subsequently neutralizing with sodium carbonate and having a content of about 20 per cent of sodium sulphate, are dissolved in 500 parts of water. To this solution 120 parts of methanol and 50 parts of benzine are added. After thoroughly mixing, the mixture is cooled down to 0° C., the sulphonation product separating out as upper layer in a solid pasty form. While maintaining the said temperature the solid constituents are filtered off by suction from the liquid portions which contain the sodium sulphate in a dissolved state. The solid product thus obtained, which amounts to about 90 per cent of the whole sulphonation product, contains only about 2 per cent of sodium sulphate.

Example 3

100 parts of the initial substance described in Example 1 are dissolved in 150 parts of benzine and sulphonated with a solution of 37 parts of chlorosulphonic acid in 37 parts of diethyl ether at a low temperature. Then the sulphonation mixture is admixed with a 20 per cent caustic soda solution until the pH-value amounts to from 6 to 7. When adding 100 parts of 50 per cent ethyl alcohol and about 160 parts of ice, the mixture separates into two layers. The bottom layer consisting of from about 280 to 300 parts is withdrawn, whereupon the upper layer which consists of about 350 parts and contains the salt-free alcohol sulphonate, is subjected 4 or 5 times to extraction with benzine after adding afresh 40 parts of ethyl alcohol. The product thus freed from inorganic salts and unsulphonated constituents is evaporated and dried, about 100 parts of a pure salt-free alcohol sulphonate being obtained.

Example 4

100 parts of a mixture of alcohols of high molecular weight obtained by hydrogenating the unsaponifiable constituents of the oxidation product of the oil obtained by the exudation of scale wax and which has a hydroxyl number of 185 and a content of hydrocarbons of about 35 per cent, is dissolved in cold mineral oil and sulphonated at about 40° C. by the addition of a mixture consisting of 40 parts of chlorsulphonic acid and 15 parts of diethyl ether. The reaction product is neutralized with a 10 per cent caustic soda solution, then incorporated with 120 parts of ethyl alcohol and the mixture is extracted 5 times by thoroughly shaking with 80 parts of benzine each time. The solution of the alcohol sulphonates which is free from unsulphonated constituents, is then cooled down to 0° C. by the addition of 100 parts of ice, two layers thus being formed. The aqueous bottom layer which contains the inorganic salts is withdrawn; the upper layer is evaporated and the resulting product is well dried in vacuo at normal temperature. The sodium salt of the alcohol sulphonate obtained in this way contains about 4 per cent of water and 3 per cent of inorganic salts.

*Example 5*

50 parts of an alcohol sulphonate obtained by sulphonating an alcohol mixture obtainable from an oxidation product of crude paraffin wax, which sulphonate contains about 49 per cent of inorganic salts, are dissolved in 400 parts of water. After adding 70 parts of methanol and 50 parts of benzine the mixture is thoroughly stirred and cooled down to 0° C., the alcohol sulphonate precipitating in a solid state. While maintaining the temperature at 0° C., the alcohol sulphonate is filtered off from the liquid containing the inorganic salts or certrifuged. By drying an alcohol sulphonate is obtained which contains only about 4 per cent of inorganic salts.

What I claim is:—

1. The process for removing inorganic salts from sulphonation products of non-aromatic alcohols which comprises treating an aqueous solution of a sulphonation product containing inorganic salts and unsulphonated organic constituents with a water-soluble low-molecular liquid aliphatic substance and with a water-insoluble low-boiling liquid organic substance at a temperature between 5° C. below and 25° C. above zero separating from one another the layers thereby formed and recovering the pure sulphonation product from the non-aqueous layer.

2. The process for removing inorganic salts from sulphonation products of non-aromatic alcohols which comprises treating an aqueous solution of a sulphonation product containing inorganic salts with a mixture of a water-soluble low-molecular liquid aliphatic substance and a water-insoluble low-boiling liquid organic substance at a temperature between 5° C. below and 25° C. above zero separating from one another the layers thereby formed and recovering the pure sulphonation product from the non-aqueous layer.

3. The process for removing inorganic salts from sulphonation products of non-aromatic alcohols which comprises treating an aqueous solution of a sulphonation product containing inorganic salts with a water-soluble low-molecular liquid aliphatic substance and with a water-insoluble low-boiling liquid organic substance at a temperature between 5° C. below zero and 25° C. separating from one another the layers thereby formed and recovering the pure sulphonation product from the non-aqueous layer.

4. The process for removing inorganic salts from sulphonation products of non-aromatic alcohols which comprises treating an aqueous solution of a sulphonation product containing inorganic salts with a water-soluble low-molecular liquid aliphatic substance and with a water-insoluble low-boiling liquid organic substance at a temperature between 5° C. below and 25° C. above zero whereby the sulphonation product is separated out as upper layer in solid form, and separating the said solid sulphonation product from the liquid constituents by mechanical means.

5. The process for removing inorganic salts from sulphonation products of non-aromatic alcohols which comprises treating an aqueous solution of a sulphonation product containing inorganic salts with an aliphatic alcohol of low molecular weight and with a water-insoluble low-boiling liquid organic substance at a temperature between 5° C. below and 25° C. above zero separating from one another the layers thereby formed and recovering the pure sulphonation product from the non-aqueous layer.

6. The process for removing inorganic salts from sulphonation products of non-aromatic alcohols which comprises treating an aqueous solution of a sulphonation product containing inorganic salts with a water-soluble low-molecular liquid aliphatic substance and with an aliphatic hydrocarbon material of low molecular weight at a temperature between 5° C. below and 25° C. above zero separating from one another the layers thereby formed and recovering the pure sulphonation product from the non-aqueous layer.

7. The process for removing inorganic salts from sulphonation products of non-aromatic alcohols which comprises treating an aqueous solution of a sulphonation product containing inorganic salts with a water-soluble low-molecular liquid aliphatic substance and with benzine at a temperature between 5° C. below and 25° C. above zero separating from one another the layers thereby formed and recovering the pure sulphonation product from the non-aqueous layer.

8. The process for removing inorganic salts from sulphonation products of non-aromatic alcohols which comprises treating an aqueous solution of a sulphonation product containing inorganic salts with ethyl alcohol and benzine at a temperature between 5° C. below and 25° C. above zero separating from one another the layers thereby formed and recovering the pure sulphonation product from the non-aqueous layer.

9. The process for removing inorganic salts from sulphonation products of high molecular aliphatic alcohols which comprises treating an aqueous solution of a sulphonation product containing inorganic salts with a water-soluble low-molecular liquid aliphatic substance and with a water-insoluble low-boiling liquid organic substance at a temperature between 5° C. below and 25° C. above zero separating from one another the layers thereby formed and recovering the pure sulphonation product from the non-aqueous layer.

10. The process for removing inorganic salts from sulphonation products of alcohols obtained by the oxidation of paraffin wax which comprises treating an aqueous solution of a sulphonation product containing inorganic salts with a water-soluble low-molecular liquid aliphatic substance and with a water-insoluble low-boiling liquid organic substance at a temperature between 5° C. below and 25° C. above zero separating from one another the layers thereby formed and recovering the pure sulphonation product from the non-aqueous layer.

11. The process for removing inorganic salts from sulphonation products of cycloaliphatic alcohols which comprises treating an aqueous solution of a sulphonation product containing inorganic salts with a water-soluble low-molecular liquid aliphatic substance and with a water-insoluble low-boiling liquid organic substance at a temperature between 5° C. below and 25° C. above zero separating from one another the layers thereby formed and recovering the pure sulphonation product from the non-aqueous layer.

12. The process for removing inorganic salts from sulphonation products of alcohols obtainable by catalytical hydrogenation of fatty oils of vegetal origin which comprises treating an aqueous solution of a sulphonation product containing inorganic salts with a water-soluble low-boiling liquid organic substance and with a water-insoluble low-boiling liquid organic substance at a temperature between 5° C. below and 25° C. above zero separating from one another the layers thereby formed and recovering the pure sulphonation product from the non-aqueous layer.

BRUNO v. REIBNITZ.